R. G. MILLER & E. C. WATERHOUSE.
HORSE HOLDING DEVICE.
APPLICATION FILED MAR. 21, 1914.

1,123,568.

Patented Jan. 5, 1915.

WITNESSES
L. L. Burket
E. Rosenberg

INVENTORS
R. G. Miller
E. C. Waterhouse
BY
A. S. Pattison ATTORNEY

UNITED STATES PATENT OFFICE.

RALPH G. MILLER AND EDWARD C. WATERHOUSE, OF DULUTH, MINNESOTA.

HORSE-HOLDING DEVICE.

1,123,568. Specification of Letters Patent. Patented Jan. 5, 1915.

Application filed March 21, 1914. Serial No. 826,151.

*To all whom it may concern:*

Be it known that we, RALPH G. MILLER and EDWARD C. WATERHOUSE, citizens of the United States, residing at Duluth, in the county of St. Louis and State of Minnesota, have invented certain new and useful Improvements in Horse-Holding Devices, of which the following is a specification, reference being had therein to the accompanying drawing.

Our invention relates to improvements in horse holding devices, the object of which is to provide means for holding a horse when hitched to a vehicle. It relates particularly to such a means which is applied to a vehicle in a manner to become automatic after its action has been set manually.

Another object of the present invention is to provide a means for holding a horse which means is carried by a vehicle and necessitates no apparatus applied to the ground, hitching post, or the like.

Other objects and advantages of the invention will appear in the following description and the novel purpose thereof will be particularly pointed out in the appended claims.

Figure 1:
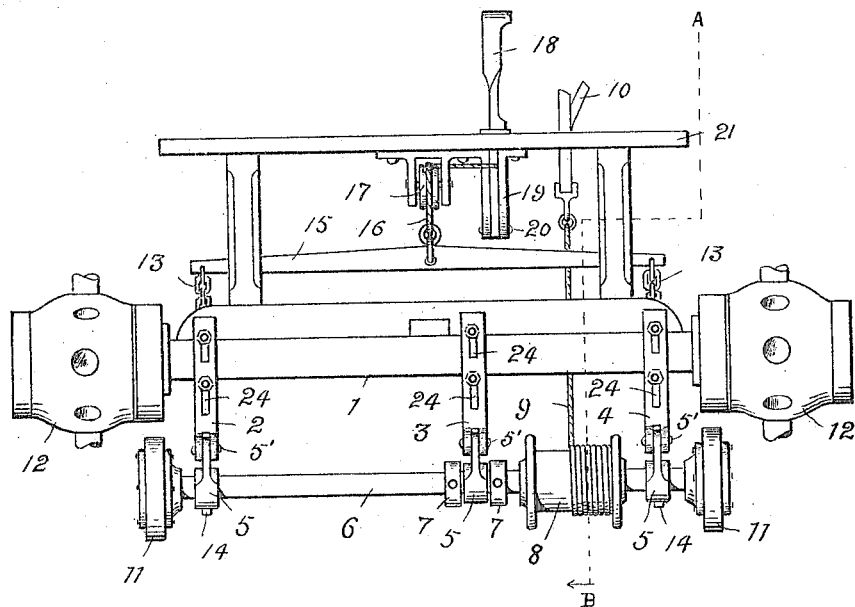
Figure 2:
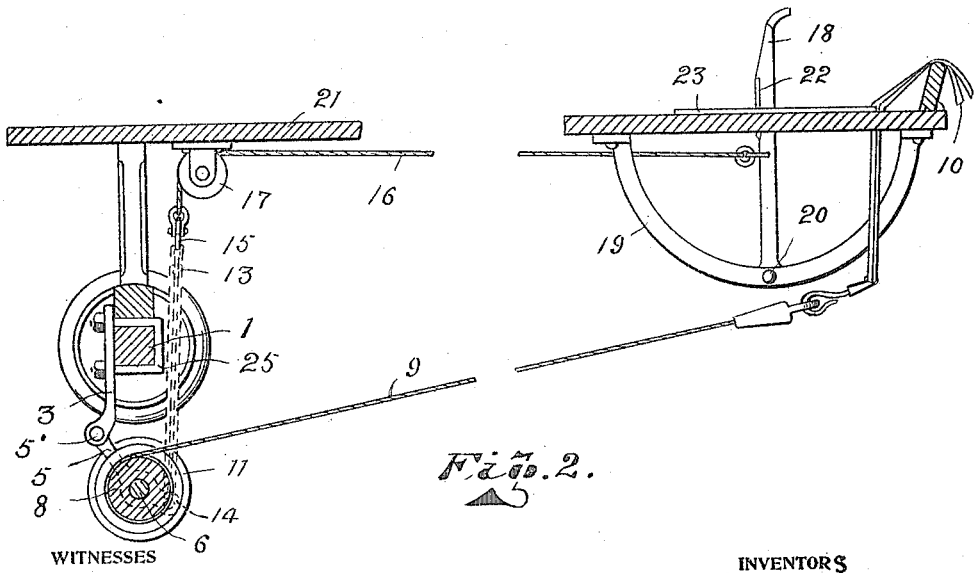

In the accompanying drawings: Figure 1 is an end elevation of the rear of a vehicle showing our invention applied thereto. Fig. 2 is a side elevation and vertical section of a fragmental portion of Fig. 1 taken along the line A—B thereof.

Referring now to the drawings in which like reference numerals designate similar parts, 1 represents the rear axle of a vehicle of the usual form, to which are attached three depending adjustable brackets 2, 3 and 4. Each of these brackets carry shaft supporting members 5 pivotally mounted on their lower ends by means of pivots 5'. A shaft 6 is mounted within these supporting members 5 and is kept from having endwise movement therein by means of fixed set collars 7—7 which are arranged on each side of the middle supporting member 5.

Mounted on a shaft 6 between two of the braces 5 is a drum 8 upon which is wound a line 9 having one end attached thereto in any convenient manner. The free end of the line 9 is extended upwardly and forwardly and attached to the free end of the driving lines 10. Pulleys 11 are mounted on each end of the shaft 6. These pulleys are of any desired construction and convenient form to contact with the circumferential surface of the wheel hubs 12—12 of the vehicle when they are brought into engagement therewith. These pulleys are brought in engagement with the hubs by means of a pair of chains 13—13 which are attached to the forwardly projecting arms 14—14. The arms 14 are made integral with and are a portion of the supporting members 5—5. The upper and free ends of the chains 13—13 are attached to opposite ends of the transverse supporting and lifting evener 15. A line 16 is attached to the center of the evener 15 and passed over a suitably suspended pulley or sheave 17 carried by the floor of the vehicle, is extended forwardly and attached to a lever 18. This lever 18 is pivotally mounted in a depending bracket 19 at a point 20. A slot is made in the floor of the vehicle 21 through which the lever 18 passes. The floor is provided with a rack 23 which meshes with a suitable projecting flange 22 carried by the lever 18, as is readily understood.

The brackets 2, 3 and 4 are made to be adjustable vertically upon the axle 1. This adjustment feature is accomplished by means of slots 24 which are made therein through which bolts of U-shaped clamps 25 pass, thus making it possible to slacken off the clamps and adjust the bracket.

In operation after the drums 11 have been brought in contact with the hubs 12 through the medium of the lever 18, as is readily understood, should the horse attempt to move forward, the line 9 to which the lines are attached will be drawn in on the drum 8. This is due to the fact that the forward motion of the wheels will impart a reverse motion to the drum. Consequently, the farther the wheels move forward, the greater the pull that will be exerted upon the reins 10 which would tend to stop the horse. It will also be noted that if the horse backs up the drum 8 will unwind and thereby slacken off on the driving lines.

Having thus fully described our invention what we claim and desire to secure by Letters Patent is:

1. The combination with a vehicle of an animal holding apparatus applied thereto, the said apparatus comprising a shaft pivotally mounted parallel to the axle, friction wheels carried by the said shaft, a compensating beam parallel to the said shaft and connected thereto, said compensating beam suspended at its center from a foot engaging lever at one end of the vehicle, and a rein manipulating spool mounted upon the said shaft intermediate the bearings thereof and adjacent one end.

2. The combination with a vehicle of an animal holding apparatus applied thereto, said apparatus comprising a shaft pivotally mounted parallel to the axle, friction wheels carried by the said shaft adapted to be brought in contact with the hubs of the wheels, a compensating beam parallel to the said shaft, a flexible connection between the compensating beam and the shaft, the said compensating beam suspended at its center from the foot-engaging lever at the forward end of the vehicle, and a rein manipulating spool mounted on the said shaft intermediate its bearings and adjacent one end of the shaft, the said spool adjacent the end of the shaft on that side of the vehicle in which the driver's seat is located.

In testimony whereof we hereunto affix our signatures in the presence of two witnesses.

RALPH G. MILLER.
EDWARD C. WATERHOUSE.

Witnesses:
M. L. DENHAM,
S. GEO. STEVENS.

Copies of this patent may be obtained for five cents each, by addressing the "Commissioner of Patents, Washington, D. C."